United States Patent
Yazaki et al.

[11] Patent Number: 5,991,719
[45] Date of Patent: Nov. 23, 1999

[54] SEMANTIC RECOGNITION SYSTEM

[75] Inventors: Masatomo Yazaki; Toshiaki Gomi; Kenji Yamamoto; Masahide Noda, all of Kanagawa, Japan

[73] Assignee: Fujistu Limited, Kawasaki, Japan

[21] Appl. No.: 09/151,291

[22] Filed: Sep. 11, 1998

[30] Foreign Application Priority Data

Apr. 27, 1998 [JP] Japan .................... 10-117524

[51] Int. Cl.⁶ .................. G01L 9/00; G06F 5/00
[52] U.S. Cl. ............ 704/251; 704/270; 704/275
[58] Field of Search .................. 704/250, 251, 704/270, 275

[56] References Cited

U.S. PATENT DOCUMENTS 4,706,212 11/1987 Toma ............................ 704/2

FOREIGN PATENT DOCUMENTS 9-330316 12/1997 Japan .

*Primary Examiner*—Susan Wieland
*Attorney, Agent, or Firm*—Staas & Halsey LLP

[57] ABSTRACT

A semantic recognition system of the present invention provides a user interface capable of receiving speech input to a user and an application interface that conveys an input content of the user to an application. The semantic recognition system includes a speech signal input part for receiving input speech signals, a speech recognizer for recognizing a corresponding word based on the input speech signals, a recognized word-semantic number converter including a semantic number-registered word list indicating the correspondence between a semantic number representing a meaning of a word and a registered word belonging to the semantic number, an application interface and an application handling the semantic numbers as data. The corresponding word is recognized by the speech recognizer, based on the speech signals input to the speech signal input part. The recognized word is converted to a corresponding semantic number by the recognized word-semantic number converter. The converted semantic number is notified to the application via the application interface.

14 Claims, 15 Drawing Sheets

| symbol number | semantic number | registered word | category | word explanation |
|---|---|---|---|---|
| 1 | 1 | STOP | NULL | NULL |
| 2 | 1 | HALT | NULL | NULL |
| 3 | 1 | CEASE | NULL | NULL |
| 4 | 1 | DON'T MOVE | NULL | NULL |
| 5 | 2 | GO RIGHT | NULL | NULL |
| 5 1 | 1 5 | JUMP | NULL | NULL |
| 5 2 | 1 5 | SPRING | NULL | NULL |
| 5 3 | 1 5 | UP | NULL | NULL |
| ... | ... | ... | ... | ... |
| ... | ... | ... | ... | ... |
| ... | ... | ... | ... | ... |

*Fig.3*

| next address in table | symbol number | semantic number | registered word | category | word explanation |
|---|---|---|---|---|---|
| Address#1 | | | | | |
| Address#2 | 1 | 1 | STOP | NULL | NULL |
| Address#2 | | | | | |
| Address#3 | 2 | 1 | HALT | NULL | NULL |
| Address#3 | | | | | |
| Address#4 | 3 | 1 | CEASE | NULL | NULL |
| Address#4 | | | | | |
| Address#5 | 4 | 1 | DON'T MOVE | NULL | NULL |
| Address#51 | | | | | |
| Address#52 | 5 1 | 1 5 | JUMP | NULL | NULL |
| Address#52 | | | | | |
| Address#53 | 5 2 | 1 5 | SPRING | NULL | NULL |
| Address#53 | | | | | |
| Address#54 | 5 3 | 1 5 | UP | NULL | NULL |
| ... | ... | ... | ... | ... | ... |

*Fig.4*

| next address in table | symbol number | semantic number | registered word | category | word explanation |
|---|---|---|---|---|---|
| Address#1 | | | | | |
| Address#2 | 1 | 1 | STOP | NULL | NULL |
| Address#2 | | | | | |
| Address#3 | 2 | 1 | HALT | NULL | NULL |
| Address#3 | | | | | |
| Address#4 | 3 | 1 | CEASE | NULL | NULL |
| Address#4 | | | | | |
| Address#5 | 4 | 1 | DON'T MOVE | NULL | NULL |
| Address#51 | | | | | |
| Address#52 | 5 1 | 1 5 | JUMP | NULL | NULL |
| Address#52 | | | | | |
| Address#53 | 5 2 | 1 5 | SPRING | NULL | NULL |
| Address#53 | | | | | |
| Address#101 | 5 3 | 1 5 | UP | NULL | NULL |
| ... | ... | ... | ... | ... | ... |
| Address#101 | | | | | |
| Address#54 | 1 0 1 | 1 5 | JUMP UP | NULL | NULL |

*Fig.5*

Application-name=Boss Voice command apl

State-name=Main

Language

LANG-ENGLISH(17)

Languge-ID=17

Dialect=Standard

Voice command

VCMD=1,1,STOP

VCMD=2,1,HALT

VCMD=3,1,CEASE

VCMD=4,1,DON'T MOVE

VCMD=5,2,GO RIGHT

VCMD=6,2,TO THE RIGHT

| symbol number | semantic number | registered number | category | word explanation |
|---|---|---|---|---|
| | 1 | | | |
| | 2 | | | |
| | 3 | | | |
| | 7 | | | |
| | 8 | | | |
| | 10 | | | |
| | 15 | | | |
| | 17 | | | |
| | 20 | | | |
| ... | ... | ... | ... | ... |
| ... | ... | ... | ... | ... |

*Fig.9*

| symbol number | semantic number | registered word | category | word explanation |
|---|---|---|---|---|
| 1 | 1 | STOPPEN | NULL | NULL |
| 2 | 1 | ANHALTEN | NULL | NULL |
| 3 | 1 | STEHENBLEIBEN | NULL | NULL |
| 4 | 1 | NICHT BEWEGEN | NULL | NULL |
| 5 | 2 | RECHTS | NULL | NULL |
| 6 | 2 | NACH RECHTS | NULL | NULL |
| . . . | . . . | . . . | . . . | . . . |
| . . . | . . . | . . . | . . . | . . . |
| . . . | . . . | . . . | . . . | . . . |

*Fig.10*

| symbol number | semantic number | registered word | category | word explanation |
|---|---|---|---|---|
| 1 | 1 | STOP | NULL | NULL |
| 2 | 1 | HALT | NULL | NULL |
| 3 | 1 | CEASE | NULL | NULL |
| 4 | 1 | DON'T MOVE | NULL | NULL |
| 5 | 1 | STOPPEN | NULL | NULL |
| 6 | 1 | ANHALTEN | NULL | NULL |
| 7 | 1 | STEHENBLEIBEN | NULL | NULL |
| 8 | 1 | NICHT BEWEGEN | NULL | NULL |
| 9 | 2 | GO RIGHT | NULL | NULL |
| 10 | 2 | TO THE RIGHT | NULL | NULL |
| ... | ... | ... | ... | ... |
| ... | ... | ... | ... | ... |
| ... | ... | ... | ... | ... |

*Fig.13*

SEMANTIC RECOGNITION SYSTEM

BACKGROUND OF THE INVENTION

1. Field of the Invention

The present invention relates to a system for providing an interface with an application to which speech can be input, the system recognizing the meaning of an input instruction to the application with speech of a user and notifying the application of the meaning.

2. Description of the Related Art

The high performance of computer systems and the development of multimedia processing techniques in recent years have allowed the advent of a highly developed human-machine interface, and thus have paved the road to the development of an interactive application with human beings.

An application employing a conventional speech recognition technique roughly includes a speech input part, a speech recognizer and an application program part. The speech input part converts voice to speech signals via a speech input apparatus such as a microphone. Alternatively, the speech input part may read data from a file in which speech signals are recorded. The speech recognizer recognizes a word represented by input speech signals by template-matching with registered speech signal patterns, and notifies the application program of the recognized word. The application program performs the subsequent processes by utilizing the recognized word notified by the speech recognizer.

The features of the conventional speech recognition application are as follows: First, the application program is described as processing programs, each of which has a one-to-one correspondence to a word for speech recognition. More specifically, the speech recognizer recognizes a word by matching the word with a registered word and notifies the application program of the matched result. Therefore, in the application, it is necessary to classify the subsequent processes into processes necessary for each word recognition previously and to describe the processes individually.

Secondly, the application depends on a language of the registered words for recognition. More specifically, since words other than the words for recognition registered in the speech recognizer cannot be recognized, the application program is described on the basis of the language of registered words and thus depends on the language.

With the advancement and the complicity of the applications for development, the diversification of changes in the market needs and the internationalization of products at the present, the development of a variety of applications is required to meet a various demands such as reduction in development workload, shortening in development time and applicability in a plurality of languages. In view of these demands, the above-described conventional speech recognition application poses the following problems.

In light of the first feature of the conventional speech recognition application that processing of an application program is described corresponding to each word for speech recognition, the conventional speech recognition application poses the problems of increase of development workload and difficulty in tuning such as change or addition of words for recognition. More specifically, since it is necessary to classify previously process contents into processes necessary for each word for recognition and to describe the processes individually, the change or addition of a word for recognition affects all related parts of the application program, so that the description is required to be changed accordingly.

In light of the second feature of the conventional speech recognition application that the application depends on the language, the conventional speech recognition application poses the problems of increase of development workload and difficulty in dealing with a plurality of languages. More specifically, since the application contains language-dependent parts, a change in word expression in accordance with the language or dialect used by a user of the system affects all the language-dependent parts, so that localization work is needed to change the description.

In the conventional speech recognition application, it is possible to update the words for recognition or register additional words by updating or adding to a table for words for recognition. However, the update or the additional registration in the table for words for recognition affects all related parts in the application program. Furthermore, in order to deal with another language, when the table for words for recognition is replaced by a new table for that language, it is necessary to replace not only the table, but also the application program itself by a specially developed application program by localizing so as to deal with the language of the new table for words for recognition.

SUMMARY OF THE INVENTION

Therefore, with the foregoing in mind, it is an object of the present invention to provide a use environment where a language-dependent speech recognizer and an application are independent from each other, and a user interface in which a language or dialect suitable for a user can be used. It is another object of the present invention to enable a speech-recognition-related application to be applied to a plurality of languages by creating a language-non-dependent system that relies on semantic recognition on the side of the application. Furthermore, it is an object of the present invention to provide a semantic recognition system that allows easy update of and change in a table for words for recognition and minimizes an effect on application program description parts of the application.

In order to achieve the objects, a semantic recognition system of the present invention includes a speech signal input part for receiving input speech signals, a speech recognizer for recognizing a corresponding word based on the input speech signals, a recognized word-semantic number converter including a semantic number-registered word list indicating the correspondence between a semantic number representing a meaning of a word and a registered word belonging to the semantic number, an application interface, and an application handling the semantic numbers as data. The corresponding word is recognized by the speech recognizer, based on the speech signals input to the speech signal input part. The recognized word is converted to a corresponding semantic number by the recognized word-semantic number converter. The converted semantic number is notified to the application via the application interface.

This embodiment provides a user interface for a most suitable language or dialect for the user, and to notify the application of language-non-dependent semantic numbers that are converted from registered words in the language-dependent speech recognizer, and thus to describe the application in the form of language-non-dependence.

Next, the semantic recognition system of the present invention preferably includes a semantic number-registered word list updater for updating a content of the semantic number-registered word list in the recognized word-semantic number converter.

This embodiment makes it possible to tune up the semantic recognition system by adding to or changing the semantic number-registered word list.

Next, the semantic recognition system of the present invention preferably includes an external description file storing a word-semantic system table that systematically describes a semantic number obtained by classifying meanings systematically and coding each semantic unit and a registered word belonging to each semantic number.

This embodiment makes it possible to separate a word-semantic system table that systematically indicates the relationship between a word and a semantic unit corresponding to the word from the application body. Thus, data for use as the basis in localizing the application can be prepared by exchanging the external description files in accordance with the use environment of the user.

Next, the application preferably contains the semantic number at least in part of process data. The recognized word-semantic number converter preferably includes a semantic number acquirer for acquiring the semantic number included in the application via the application interface, and a semantic number-registered word list generator for extracting a registered word corresponding to the acquired semantic number from the word-semantic system table in the external description file so as to generate the semantic number-registered word list.

This embodiment makes it possible to describe the application based on language-non-dependent semantic numbers and to extract automatically words of a local language corresponding to the semantic number used in the application when localizing the semantic recognition system. Thus, it is possible to reduce the workload of localization significantly.

Next, the application preferably contains the semantic number at least in part of process data, and includes the process steps of extracting a corresponding registered word from the word-semantic system table in the external description file, based on the semantic number included in the application, and notifying the recognized word-semantic number converter of the semantic number and the registered word. The recognized word-semantic number converter preferably includes a semantic number-registered word list generator for generating the semantic number-registered word list, based on the semantic number and the registered word acquired from the application.

This embodiment makes it possible to describe the application based on language-non-dependent semantic numbers and to allow the application to notify words of a local language corresponding to the semantic number used in the application when localizing the semantic recognition system. Thus, it is possible to reduce the workload of localization significantly.

Next, the recognized word-semantic number converter preferably includes a registered word notifier for notifying the speech recognizer of registered words listed in the generated semantic number-registered word list. The speech recognizer preferably includes a speech recognition word updater for updating a content of a speech recognition engine based on the notified registered word.

This embodiment makes it possible to generate automatically the content of the speech recognition engine necessary to specify and recognize a word that needs to be recognized in the speech recognizer to utilize in the application. Thus, it is possible to reduce the workload of localization significantly.

Next, the semantic recognition system of the present invention preferably includes a use language selector for selecting a language for the user to use, external description files each of which corresponds to each of a plurality of languages as the external description file, and speech recognition engines each of which corresponds to each of a plurality of languages as the speech recognition engine in the speech recognizer. The semantic number-registered word list generator generates a semantic number-registered word list, based on the external description file of a language selected by the use language selector. The speech recognizer uses the speech recognition engine of a language selected by the use language selector. Thus, a multilingual user interface preparing the application for input instructions in a plurality of languages can be provided to the user.

This embodiment makes it easy to perform customizing work in accordance with the language and the expression used by the user. Furthermore, the selection of the external description files and the speech recognition engines of a plurality of languages makes it possible to generate automatically semantic number-registered word lists of a plurality of languages and update the contents of the speech recognition engines. Thus, the application can be multilingual so that an instruction can be input with speech in a plurality of languages at the same time. Herein, the language includes dialects such as Kansai dialect and Tohoku dialect or dialects in other countries, in addition to languages such as English and German.

Next, the semantic recognition system of the present invention preferably includes an external description file server for providing the external description file, an application server for providing the application, a semantic recognition system client including the speech signal input part, the speech recognizer, the recognized word-semantic number converter and the application interface. The external description file server, the application server and the semantic recognition system client are connected via a computer network.

This embodiment provides the external description file on a client and server structure including an external description file server arranged on the network. Thus, the necessity of preparing the external description file for each language for an individual semantic recognition system can be eliminated.

Next, the present invention provides a computer-readable recording medium where a semantic recognition process program is recorded. The program includes the speech signal input process step of receiving input speech signals, the speech recognizing process step of recognizing a corresponding word based on the input speech signals, the semantic number-registered word list generating process step of generating a semantic number-registered word list indicating the correspondence between a semantic number representing a meaning and a registered word belonging to the semantic number, the recognized word-semantic number converting process step of converting a word recognized at the speech recognizing process step to a corresponding semantic number with reference to the generated semantic number-registered word list, and the semantic number notifying process step of notifying the application of the converted semantic number.

This embodiment provides a semantic recognition system including a user interface for a most suitable language or dialect for the user by utilizing a computer system, and to notify the application of language-non-dependent semantic numbers that are converted from registered words in the language-dependent speech recognizer. Thus, the application can be described in the form of language-non-independence.

Next, the semantic recognition process program of the present invention preferably includes the semantic number-registered word list-updating process step of updating the content of the semantic number-registered word list.

This embodiment makes it possible to perform the process of adding to or changing the semantic number-registered word list and thus to tune up the processes by the semantic recognition system.

Next, the semantic recognition process program of the present invention preferably includes an external description file storing a word-semantic system table that systematically describes a semantic number obtained by classifying meanings systematically and coding each semantic unit and a registered word belonging to each semantic number.

This embodiment in this semantic recognition process program makes it possible to separate a word-semantic system table that systematically indicates the relationship between a word and a semantic unit corresponding to the word from the application body. Thus, data for use as the basis in localizing the application can be prepared by exchanging the external description files in accordance with the use environment of the user.

Next, in the semantic recognition process program of the present invention, the application preferably contains the semantic number at least in part of process data. The semantic recognition process program preferably includes the semantic number acquiring process step of acquiring the semantic number included in the application via the application interface. The semantic number-registered word list generating process step of extracting a registered word corresponding to the acquired semantic number from the word-semantic system table in the external description file so as to generate the semantic number-registered word list, and the registered word notifying process step of notifying the speech recognizing process step of the registered words listed in the generated semantic number-registered word list. The speech recognizing process step preferably includes the speech recognition word updating process step of updating the content of the speech recognition engine, based on the notified registered words.

This embodiment makes it possible to describe the application based on language-non-dependent semantic numbers and to extract automatically words of a local language corresponding to the semantic number used in the application when localizing the semantic recognition system. Thus, it is possible to reduce the workload of localization significantly.

Next, the semantic recognition process program of the present invention preferably includes the use language selecting process step of selecting a language for the user to use, external description files each of which corresponds to each of a plurality of languages as the external description file, and speech recognition engines each of which corresponds to each of a plurality of languages as the speech recognition engine for use at the speech recognizing process step. At the semantic number-registered word list generating step, a semantic number-registered word list is generated, based on the external description file of a language selected at the use language selecting process step. At the speech recognizing process step, the speech recognition engine of a language selected at the use language selecting process step is used. Thus, a multilingual user interface preparing the application for input instructions in a plurality of languages can be provided to the user.

This embodiment facilitates customizing work in accordance with the language and the expression used by the user of the semantic recognition system. Furthermore, the selection of a plurality of external description files makes it possible to generate automatically semantic number-registered word lists of a plurality of languages and update the contents of the speech recognition engines. Thus, the application can be multilingual so that an instruction can be input with speech in a plurality of languages.

Next, the semantic recognition process program of the present invention preferably includes a process program for an external description file server on the network including an external description file providing process step for providing the external description file, a process program for an application server on the network including an application providing process step for providing the application, and a process program for a semantic recognition system client that communicates with the process program for the external description file server and the process program for the application server on the network.

This embodiment provides a semantic recognition system on a client and server structure for providing the external description file and the application from the servers arranged on the network.

The semantic recognition system of the present invention provides a user with a user interface for speech input in the language used by the user, so that the user can enjoy an application such as a game by speech input in his own language. Furthermore, the present invention can provide an application interface that conveys language-non-dependent meaning to the application, so that the user-input command to the application can be described in language-non-dependent intermediate codes such as semantic numbers. This eliminates the workload of an application developer for localization to other languages.

Furthermore, according to the semantic recognition system of the present invention, every time an application is used, only the semantic number-registered word list that is to be used exclusively for the application is generated. Therefore, the used capacity of the main memory can be minimized, so that the rate of speech recognition can be high.

Furthermore, according to the semantic recognition system of the present invention, the user-input command group used in the loaded application is automatically converted to the command group represented by a plurality of languages used by the users. Therefore, a multilingual user interface for speech input in a plurality of languages can be obtained.

Furthermore, when the external description file of the semantic recognition system of the present invention is provided on the client and server structure including the external description file server on the network, it is not necessary to prepare the external description file for each language for an individual semantic recognition system. Thus, the diversification of utilization forms and the low cost of the system can be realized.

These and other advantages of the present invention will become apparent to those skilled in the art upon reading and understanding the following detailed description with reference to the accompanying figures.

BRIEF DESCRIPTION OF THE DRAWINGS

FIG. 3 shows an example of a semantic number-registered word list.

FIG. 4 shows another example of a semantic number-registered word list.

FIG. 5 shows an example of a semantic number-registered word list in which registered word-semantic number sets are added.

FIG. 8 shows an example of an external description file 50.

FIG. 9 shows an example of a semantic number-registered word list 41 with acquired semantic numbers.

FIG. 10 shows an example of a completed semantic number-registered word list 41.

FIG. 13 shows an example of a completed semantic number-registered word list.

DESCRIPTION OF THE PREFERRED EMBODIMENTS

Hereinafter, the present invention will be described by way of embodiments with reference to the accompanying drawings.

Embodiment 1

A semantic recognition system according to Embodiment 1 provides a user with a user interface to which speech can be input, and provides an application interface that conveys the input content of the user in the form of language-non-dependence to the application by noting the inherent meaning of an individual word and recognizing the meaning. In Embodiment 1, the application is a game including a process of controlling the movement of an object on the screen by speech instructions. The user is an English speaker, and the user interface is configured for the English environment.

Figure 1:
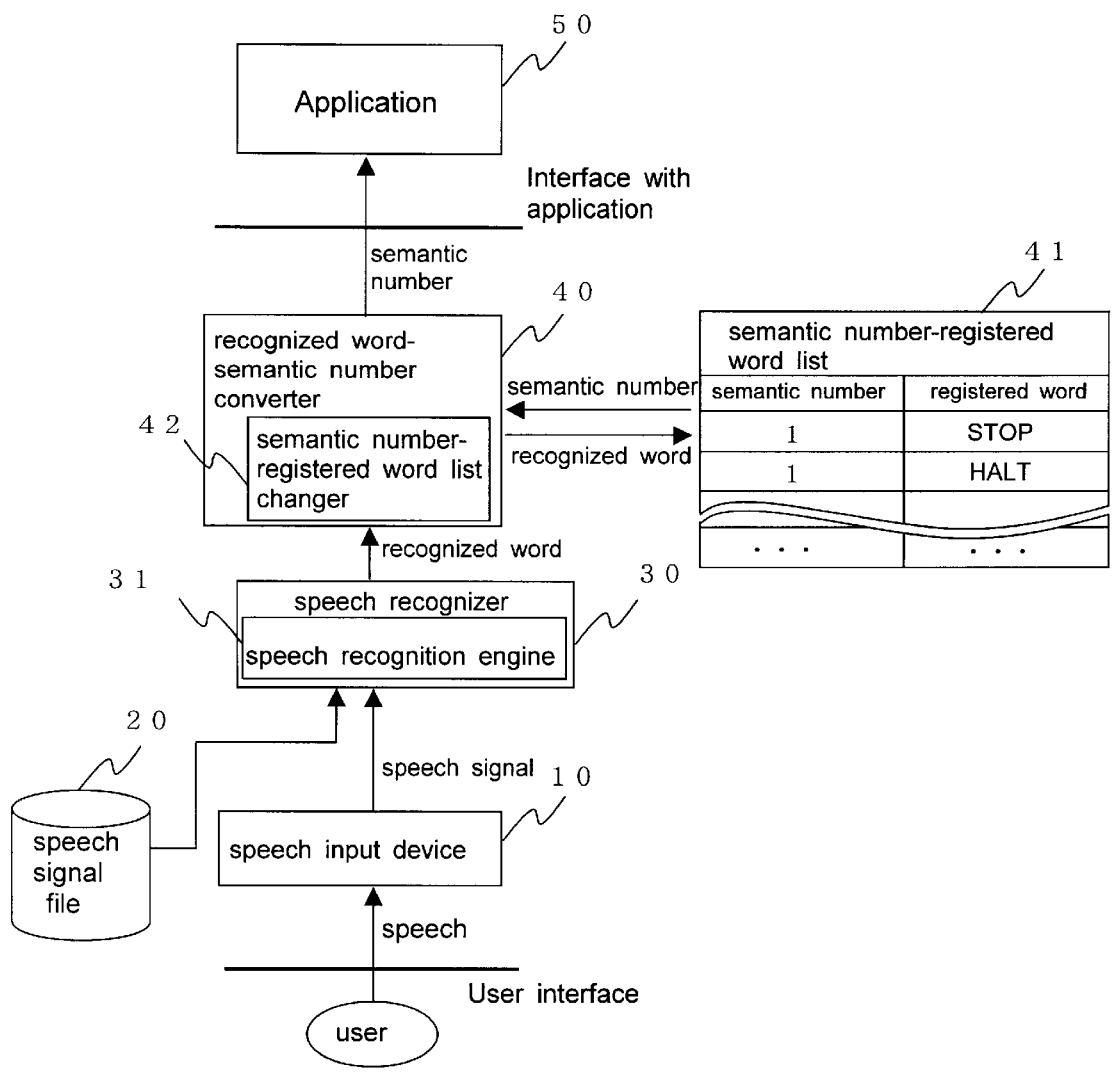
FIG. 1 is a schematic diagram showing a semantic recognition system according to Embodiment 1 of the present invention.
Figure 2:
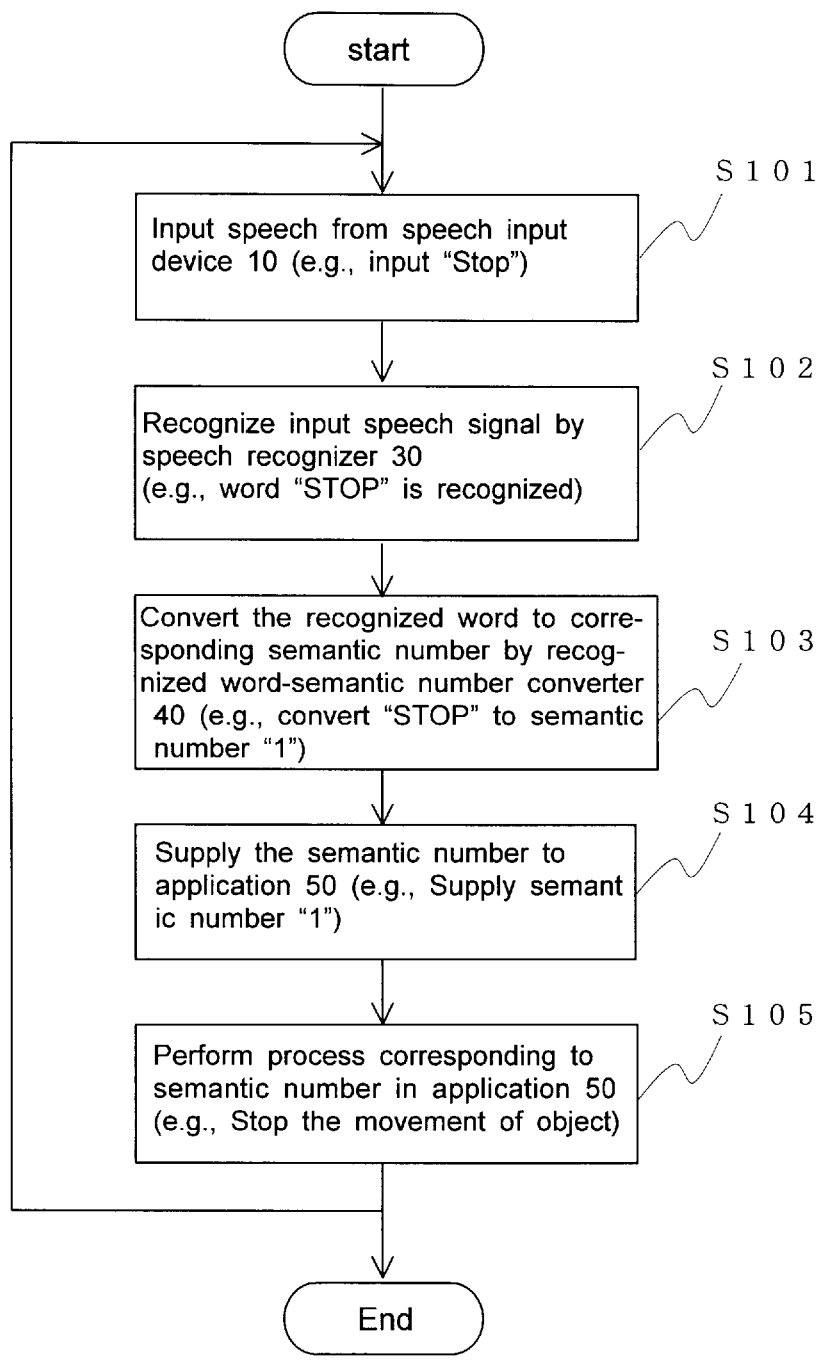
FIG. 2 is a flow chart showing the processes of the semantic recognition system according to Embodiment 1 of the present invention.

The outline of the entire structure of the semantic recognition system and the process flow of the system according to Embodiment 1 will be described with reference to figures. FIG. 1 is a schematic diagram showing the semantic recognition system of Embodiment 1. FIG. 2 is a flow chart showing the process steps of the system.

As shown in FIG. 1, the semantic recognition system of Embodiment 1 roughly includes a speech input device 10, a speech signal file 20, a speech recognizer 30, a recognized word-semantic number converter 40, and an application 50. The system also includes other elements necessary to control the entire system such as a controller and a memory, although they are not shown in FIG. 1.

The speech input device 10 can be any device that can convert input speech to electric signals such as a microphone or a telephone. The speech signal file 20 is a file where input speech signal has been edited and recorded previously. The speech recognizer 30 includes a speech recognition engine 31, and the speech recognition engine 31 is exchangeable in accordance with the language used by the user. The recognized word-semantic number converter 40 includes a semantic number-registered word list 41 indicating the correspondence between the word recognized by the speech recognition and the meaning of the word, and a semantic number-registered word list changer 42 for adding to or changing the content of the semantic number-registered word list 41. Herein, the "semantic number" refers to numbers obtained by classifying words systematically by the meaning and coding the classified semantic unit which is an assemblage of words having the same meaning. The semantic number is a language-non-dependent intermediate code that is assigned to the inherent meaning of each word. This can be used because the meaning of the word is not changed with different languages. This semantic number may cover all the words belonging to the language system of interest. Alternatively, in view of system resources and effectiveness, the semantic number may cover only the words possibly used in the field of the application such as a game that is scheduled to be used.

An application interface that conveys the content of speech input of the user is provided between the recognized word-semantic number converter 40 and the application 50. The application 50 includes the semantic number in a part of the processing data.

The outline of the process flow of the semantic recognition system is as follows. First, the user inputs an instruction to the application 50 with his own words via the speech input device 10 such as a microphone provided as the user interface. For example, in this embodiment, "stop" is input. Next, the input speech "stop" is converted to electric signals, and the electric signals are input to the speech recognizer 30. Instead of the speech input by the speech input device 10, corresponding speech signals in the speech signal file 20 where the words to be input have been edited and recorded previously can be input to the speech recognizer 30 (step S101 in FIG. 2).

Next, the speech recognizer 30 recognizes input speech signals. The speech recognition engine 31 in the speech recognizer 30 in this embodiment is, for example, a speech recognition engine for English. The speech recognizer 30 performs processes such as a morpheme process and a template matching process, which are regular speech recognition processes so as to recognize the input word. In this embodiment, the speech "stop" is recognized as word data "STOP" (step S102 in FIG. 2).

Next, the recognized word-semantic number converter 40 converts the word data recognized in step S102 to the corresponding semantic number. The recognized word-semantic number converter 40 searches the semantic number-registered word list 41 for the semantic number corresponding to the recognized word data. In this embodiment, for example, the recognized word data "STOP" is converted to a semantic number "1" (step S103 in FIG. 2).

FIGS. 3 and 4 show examples of semantic number-registered word lists. The list shown in FIG. 3 has data structure whose element members consist of "symbol number", "semantic number" and "registered word", and "category" and "word explanation" as accessory information of a word in an array. The symbol number refers to a number that is uniquely assigned to each entry. The registered word refers to a character string to be recognized. The category refers to a code obtained by coding the classification of the registered word. The word explanation refers to explanation on the registered word. When no category or no word explanation is assigned, "NULL", for example, is assigned.

The list shown in FIG. 4 has element members consisting of the element members shown in FIG. 3, and "next address in table", which is an element member for managing a link list. This structure facilitates insertion and deletion of each entry.

Next, the semantic number obtained at step S103 is supplied to the application 50 via the application interface (step S104 in FIG. 2).

The application 50 includes the semantic numbers in a part of the process content so that a process corresponding to an input semantic number is performed. The application 50 is a game including a process of controlling the movement of an object on the screen by speech instructions. In this embodiment, for example, a process of stopping the movement of the object is performed in response to the semantic number "1" (step S105 in FIG. 2). In this example, a process that stops the movement of the object on the screen is performed in response to the speech instruction of "stop" from the microphone.

These semantic recognition processes (steps S101 to S105 in FIG. 2) are repeatedly performed, as desired, depending on the progress of the game of the user.

The outline of the structure of the semantic recognition system according to Embodiment 1 and the outline of the process flow of the system have been described above.

The speech input from the input device 10 conveys the instruction to the application 50 in the above-described manner. The semantic recognition system of Embodiment 1 provides a user interface for speech input to the user, and provides an application interface that conveys the language-non-dependent meaning to the application.

In Embodiment 1, the present invention has been described by taking English as example. However, the present invention can be applied to any languages by tuning up the system. More specifically, the present invention can be used in another language by replacing the speech recognition engine 31 of the speech recognizer 30 and the semantic number-registered word list 41 of the recognized word-semantic number converter 40 by the speech recognition engine and the semantic number-registered word list of a desired language, respectively. The same semantic number of the semantic number-registered word list is assigned to the same meaning, even if different languages are used. Therefore, the semantic number is language-non-dependent. The same semantic number is conveyed to the application 50 in response to the speech input instruction having the same meaning. The application 50 performs the same process in response to the same semantic number. Thus, the semantic recognition based on the inherent meaning of each word can provide an application interface that conveys the speech input content of the user in the form of language-non-dependence.

Furthermore, the semantic number-registered word list changer 42 of the recognized word-semantic number converter 40 can added to or change the content of the semantic number-registered word list 41. For example, as described with reference to the list in FIG. 4, the use of the element member "next address in table" facilitates insertion or deletion of entry, as shown in FIG. 5. FIG. 5 shows an example where a recognized word-semantic number set consisting of a recognized word "JUMP UP" and a semantic number "15" is added to the semantic number-registered word list 41. The semantic number-registered word list changer 42 makes it possible to tune up the semantic recognition system in accordance with the use environment.

Embodiment 2

A semantic recognition system according to Embodiment 2 will be described with reference to figures. The semantic recognition system of Embodiment 2 provides a user interface based on speech input to the user and an application interface that conveys the speech input content of the user in the form of language-non-dependence to the application, as in Embodiment 1. However, the semantic recognition system of Embodiment 2 is characterized in that the user interface for operating the application is customized by obtaining information from the application, in addition to loading the application.

In Embodiment 2 as in Embodiment 1, the application is a game including a process of controlling the movement of an object on the screen by a speech instruction. However, the user is a German speaker, and the user interface is configured for the German environment.

Figure 6:
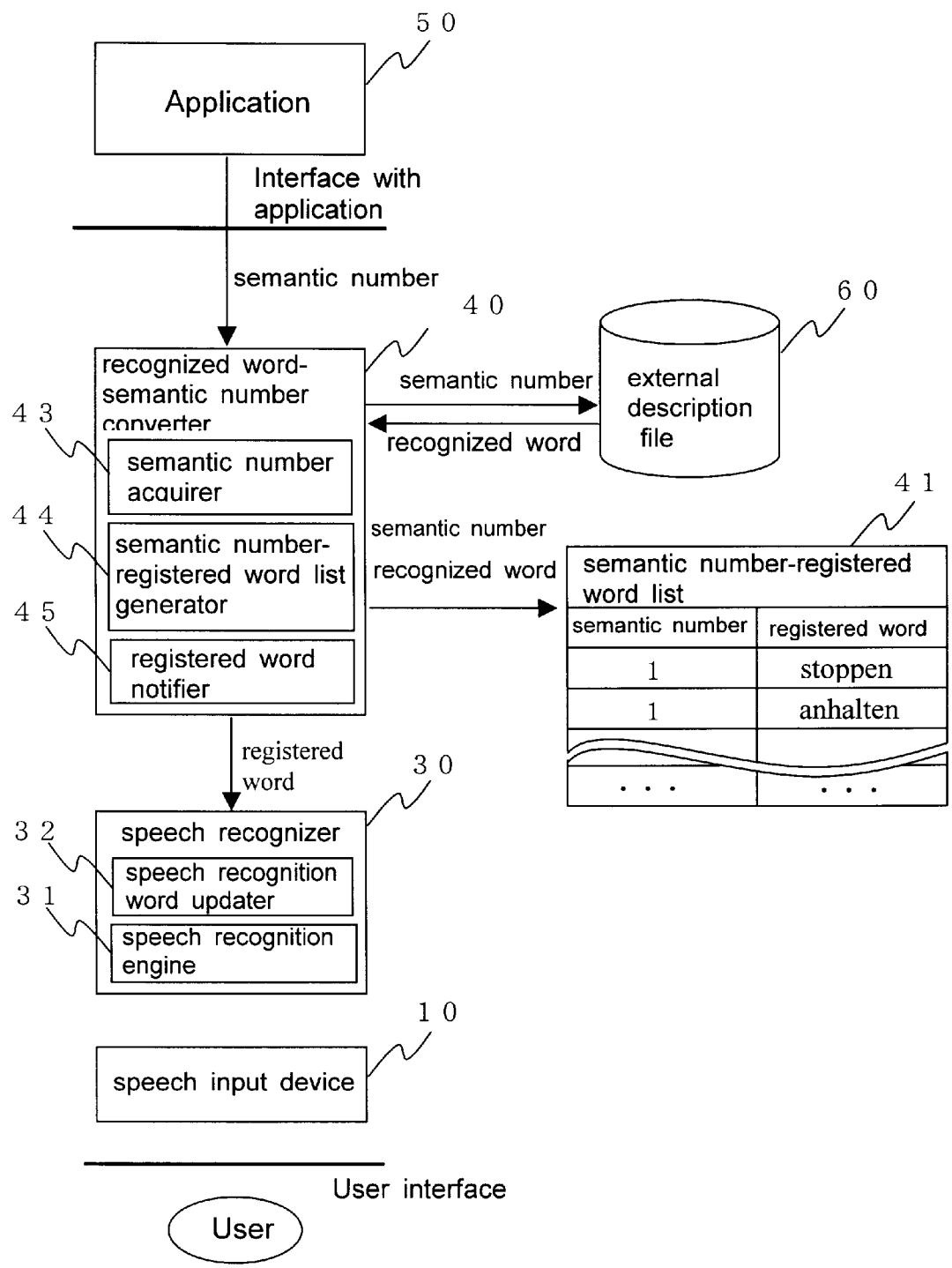
FIG. 6 is a schematic diagram showing a semantic recognition system according to Embodiment 2 of the present invention.
Figure 7:
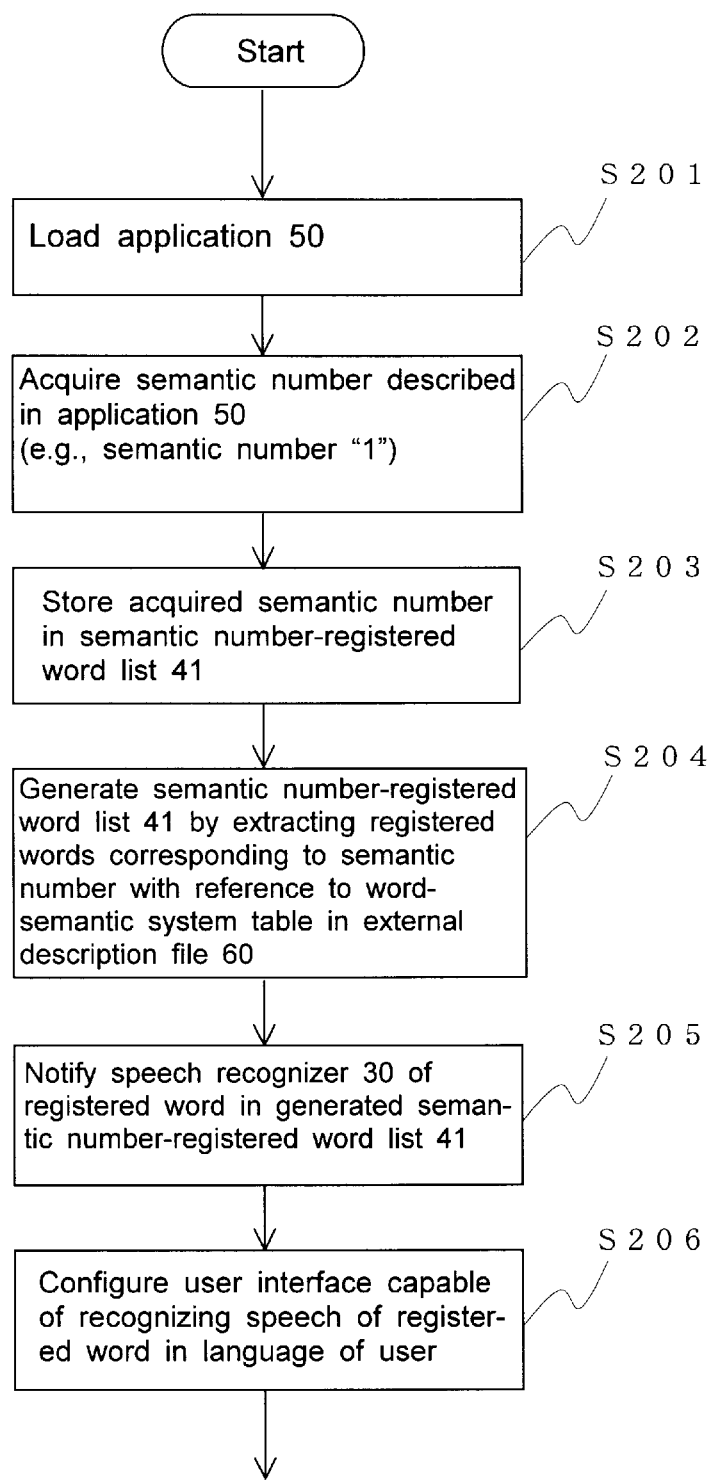
FIG. 7 is a flow chart showing the processes of the semantic recognition system according to Embodiment 2 of the present invention.

The outline of the entire structure of the semantic recognition system and the process flow of the system according to Embodiment 2 will be described with reference to figures. FIG. 6 is a schematic diagram showing the semantic recognition system of Embodiment 2. FIG. 7 is a flow chart showing the process steps of the system.

As shown in FIG. 6, the semantic recognition system of Embodiment 2 roughly includes a speech input device 10, a speech signal file 20 (not shown), a speech recognizer 30, a recognized word-semantic number converter 40, an application 50 and an external description file 60. The system also includes other elements necessary to control the entire system such as a controller and a memory, although they are not shown in FIG. 6. The same elements as in Embodiment 1 bear the same reference numerals.

The application 50 includes semantic numbers in at least part of data for processing.

The external description file 60 is an external file separated from the application body, and may be stored in an accessible secondary storage medium such as a hard disk and a CD-ROM, and may not necessarily be integrated with the program. The file recorded in the external description file 60 contains tables systematically describing relationship between semantic numbers obtained by classifying the meanings systematically and coding each semantic unit and the registered word which belongs to each semantic number. The word-semantic system table may include a registered word group that covers all the words belonging to the language system of interest and the corresponding semantic number group. Alternatively, in view of system resources and effectiveness, the semantic number may cover only the words possibly used in the field of the application such as a game that is scheduled to be used.

FIG. 8 shows an example of the external description file. "State-name" refers to an attribute for selecting a name to describe a category when registering a word. "Language-ID" refers to an attribute representing the language of a word, and includes a basic language ID and a sub-language ID. "Dialect" refers to an attribute with respect to dialects of a language, and the "VCMD" refers to a key word to describe a voice command, and a set of semantic number-registered word, which constitute entries in the semantic number-registered word list 41. "#" indicates that the line with # is a comment text.

The recognized word-semantic number converter 40 includes a semantic number acquirer 43, a semantic number-registered word list generator 44 and a registered word notifier 45. The semantic number acquirer 43 acquires semantic numbers described in the application 50 via the application interface. The semantic number-registered word list generator 44 extracts all the registered word corresponding to the acquired semantic numbers from the external description file 60 so as to generate the semantic number-registered word list 41. The registered word notifier 45 notifies the speech recognizer 30 of the registered words listed in the semantic number-registered word list 41 generated by the recognized word-semantic number converter 40.

The speech recognizer 30 includes a speech recognition engine 31 corresponding to the language used by the user and a speech recognition word updater 32. The speech recognition word updater 32 updates the content of the speech recognition engine 31 based on the registered words notified from the registered word notifier 45.

The outline of the process flow of the semantic recognition system of Embodiment 2 is as follows. First, the application 50 is loaded to the semantic recognition system. The loading is performed with an IO unit such as a CD-ROM drive or from the network (not shown) (step S201 in FIG. 7). In this embodiment, for example, the application 50 is a game including a process of controlling the movement of an object on the screen, and includes the description of a command of moving the object based on the semantic number in a part of the process program.

Next, the semantic number acquirer 43 in the recognized word-semantic number converter 40 acquires the semantic numbers described in the application via the application interface (step S202 in FIG. 7). In this embodiment, for example, a semantic number "1" is acquired.

The semantic number acquired at step S202 is delivered to the semantic number-registered word list generator 44. The semantic number-registered word list generator 44 stores the semantic number-registered word list 41 containing the acquired semantic numbers, as shown in FIG. 9 (step S203 in FIG. 7).

Next, the semantic number-registered word list generator 44 extracts registered words corresponding to the semantic numbers in the semantic number-registered word list 41 with reference to the word-semantic system table in the external description file 60 so as to generate the semantic number-registered word list 41 (step S204 in FIG. 7). FIG. 10 shows an example of the generated semantic number-registered word list 41. The command group used in the application is generated from intermediate codes which are semantic numbers as a command group represented by the language used by the user. In this embodiment, the command group in German is generated. As shown in FIG. 10, the registered word in the external description file 60 corresponding to the semantic numbers are extracted and put in the list. For example, the semantic number "1" representing the meaning of "stop" corresponds to German words that have the direct meanings, such as "STOPPEN" or "ANHALTEN". In addition, synonyms or similar phases such as "STEHEN-BLEIBEN" or "NICHT BEWEGEN" that lead to the same behavior of the object may be included.

Next, the registered word notifier 45 in the recognized word-semantic number converter 40 notifies the speech recognizer 30 of the registered words listed in the semantic number-registered word list 41 generated at step S204 (step S205 in FIG. 7). In this embodiment, the registered words "STOPPEN", "ANHALTEN" or the like are notified.

Next, the speech recognizer 30 updates the content of the speech recognition engine 31 by the speech recognition word updater 32, based on the registered words notified at step S205. More specifically, the speech recognizer 30 updates the content of the recognition patterns of speech signals utilized by the speech recognition engine, and thus a user interface that can recognize the registered words notified at step S205 with speech by the language of the user can be configured (step S206 in FIG. 7).

The processes of steps S201 to S206 as described above are performed so that the user-input-command group for use in the loaded application is converted automatically from the semantic numbers which are the language-non-dependent intermediate codes to the command group represented by the language used by the user, and thus the user interface for speech input can be configured.

After the customizing process for the user interface at steps S201 to 206 described above, the process step of FIG. 2 in Embodiment 1 is performed so that the user can enjoy the application such as a game by inputting speech in his own language. Furthermore, the semantic number-registered word list 41 to be used in the application is generated in accordance with the application. Therefore, it is possible to optimize and minimize usage of the main memory. Furthermore, since the user input commands for the application can be described in the language-non-dependent intermediate codes such as the semantic number, the workload of an application developer for localizing to another language can be eliminated.

In the above description, the example of the user interface for speech input in German has been described, but user interfaces in other languages can be configured by providing an external description file and a speech recognition engine for a desired language as the basic elements that are suitable for the environment where the semantic recognition system is to be used.

In the above description, the recognized word-semantic number converter includes the semantic number acquirer for acquiring the semantic numbers described in the application and the semantic number-registered word list generator. However, instead of the semantic number acquirer and the semantic number-registered word list generator, the application may include the process step of extracting corresponding registered words from the word-semantic system table in the external description file based on the semantic numbers described in the application, and the process step of notifying the recognized word-semantic number converter of the semantic numbers and the registered words. In this case, the recognized word-semantic number converter includes the semantic number-registered word list generator for generating the semantic number-registered word list based on the notified semantic number and registered words.

Embodiment 3

A semantic recognition system according to Embodiment 3 will be described with reference to figures. The semantic recognition system of Embodiment 3 provides a user interface for speech input to the user and an application interface that conveys the speech input content of the user in the form of language-non-dependence to the application, as in Embodiments 1 and 2. However, the semantic recognition system of Embodiment 3 is characterized in that the language of the user interface can be selected or updated freely by the user, and a plurality of languages can be dealt with simultaneously. The user interface can be suitably used in an environment where the user uses a plurality of languages, or a plurality of users speaking different languages use the system at the same time. In Embodiment 3, the configuration of a user interface for multilingual input will be particularly described.

In Embodiment 3 as in Embodiment 1, the application is a game including a process of controlling the movement of an object on the screen by speech instructions. One user is an English speaker, and the other user is a German speaker, and the user interface is configured for the English input environment and the German input environment.

Figure 11:
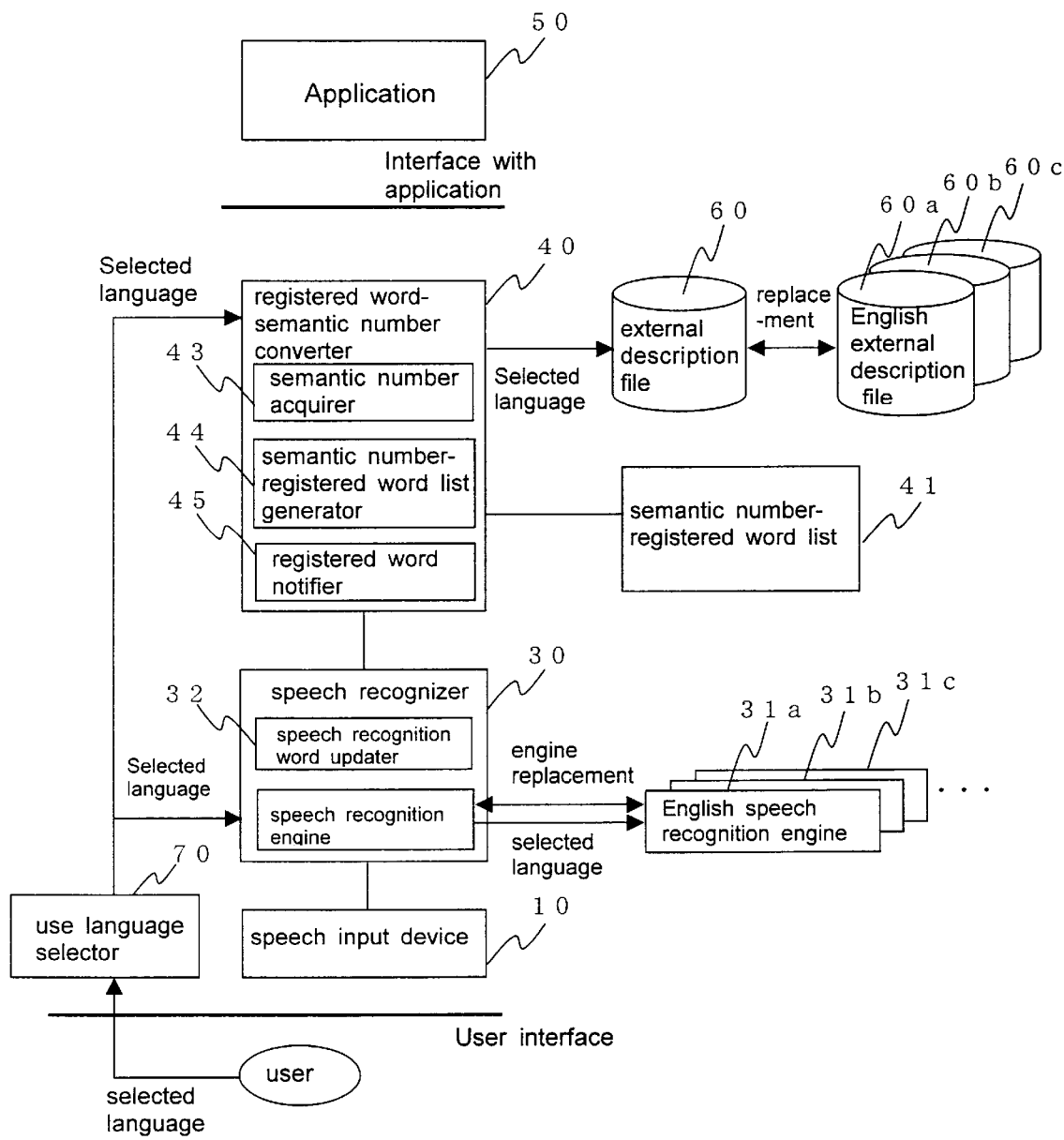
FIG. 11 is a schematic diagram showing a semantic recognition system according to Embodiment 3 of the present invention.
Figure 12:
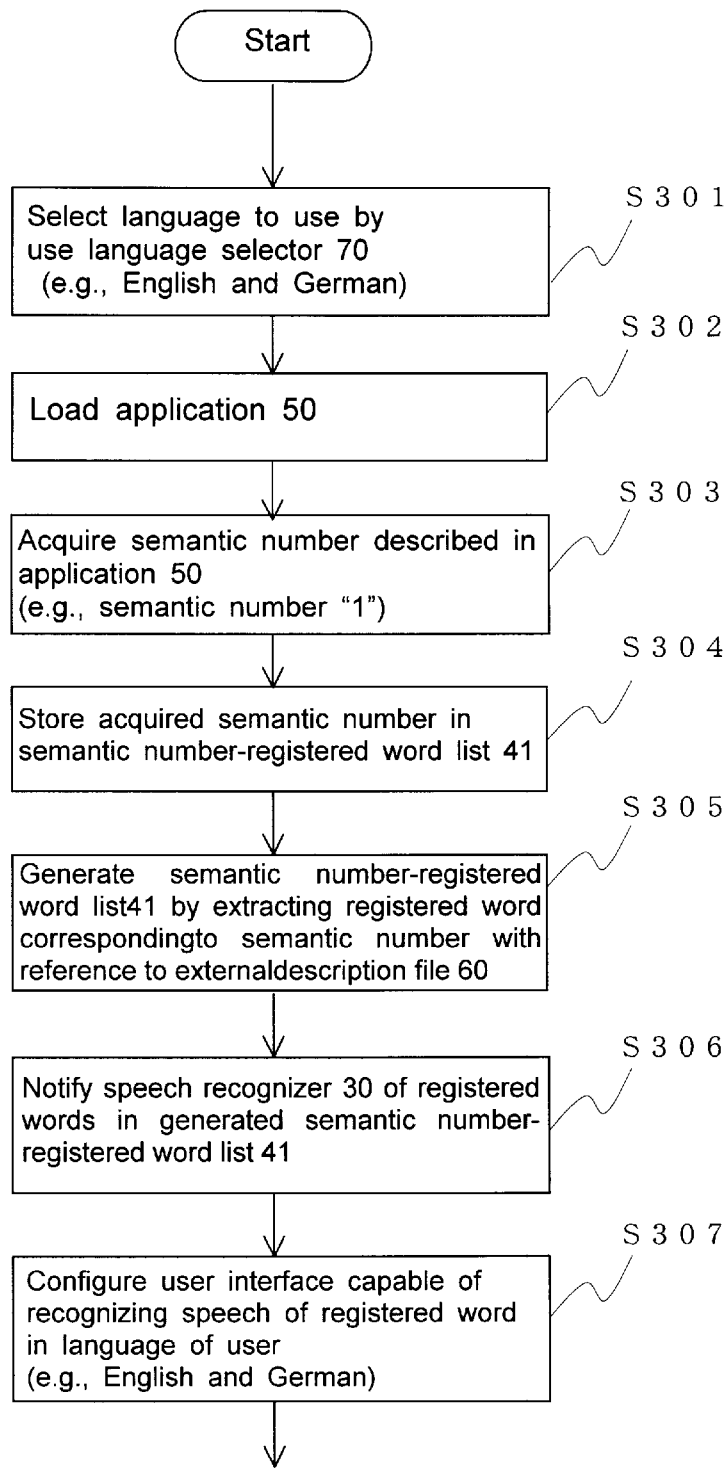
FIG. 12 is a flow chart showing the processes of the semantic recognition system according to Embodiment 3 of the present invention.

The outline of the entire structure of the semantic recognition system and the outline of the process flow of the system according to Embodiment 3 will be described with reference to figures. FIG. 11 is a schematic diagram showing the semantic recognition system of Embodiment 3. FIG. 12 is a flow chart showing the process steps of the system.

FIG. 11 is substantially the same as FIG. 6 except that the semantic recognition system of Embodiment of 3 includes a use language selector 70 so that the user can select a language that the user desires to use. The external description file 60 stores files, each of which corresponds to one language, such as an English external description file 60*a*, a German external description file 60*b*, a Japanese external description file 60*c* or the like. Furthermore, the speech recognition engine 31 in the speech recognizer 30 is prepared for each language, and the speech recognizer 30 includes an English speech recognition engine 31*a*, a German speech recognition engine 31*b*, a Japanese speech recognition engine 31*c* or the like. The same elements as in FIGS. 1 and 6 bear the same reference numerals, and are not further described. Furthermore, for the sake of convenient, arrows between elements in FIG. 11 show the transmission of data about a language selection at step S301, which will be described later, and arrows relating to other processes are not shown.

The outline of the process flow of the semantic recognition system of Embodiment 3 is as follows. The same processes as described in Embodiment 2 with reference to FIG. 7 will be described briefly. First, the user selects a language that the user desires to use by the use language selector 70 (step S301 in FIG. 12). In this embodiment, English and German are selected. The language information input for selection by the use language selector 70 is notified to the registered word-semantic number converter 40 and the speech recognizer 30 as language ID information. In this embodiment, the English external description file 60*a* and the German external description file 60*b*, and the English speech recognition engine 31*a* and the German speech recognition engine 31*b* are prepared.

Next, the application 50 is loaded to the semantic recognition system (step S302 in FIG. 12).

Next, the semantic number acquirer 43 in the recognized word-semantic number converter 40 acquires the semantic numbers described in the application 50 via the application interface (step S303 in FIG. 12). In this embodiment, for example, semantic numbers "1", etc. are acquired.

The semantic number acquired at step S303 is delivered to the semantic number-registered word list generator 44. The semantic number-registered word list generator 44 stores the semantic number-registered word list 41 containing the acquired semantic numbers, as shown in FIG. 9 as in Embodiment 2 (step S304 in FIG. 12).

Next, the semantic number-registered word list generator 44 refers to the external description file selected based on the language ID notified at step S301. In this embodiment, the English external description file 60*a* and the German external nal description file 60*b* are referred to. The semantic number-registered word list generator 44 extracts the registered words corresponding to the semantic numbers in the semantic number-registered word list 41 with reference to the word-semantic system table in the each external description file 60 so as to complete the semantic number-registered word list 41 (step S305 in FIG. 12). FIG. 13 shows an example of the completed semantic number-registered word list 41. Thus, the command group for use in the application is generated from intermediate codes which are semantic numbers as command groups represented by a plurality of languages selected by the user. In this embodiment, the command groups in English and German are generated.

Next, the registered word notifier 45 in the recognized word-semantic number converter 40 notifies the speech recognizer 30 of the registered words listed in the semantic number-registered word list 41 generated at step S305 together with the language IDs (step S306 in FIG. 12).

Next, the speech recognizer 30 updates the content of the speech recognition engine 31 by the speech recognition word updater 32, based on the registered words and the language IDs notified at step S306. More specifically, the English speech recognition engine 31*a* and the German speech recognition engine 31*b* are tuned up (step S307 in FIG. 12).

The processes of steps S301 to S307 as described above are performed so that the user-input-command group for use in the loaded application is converted automatically to the command group represented by a plurality of languages used by the users, and thus the multilingual user interface for speech input in a plurality of languages can be configured.

After the customizing process for the user interface at steps described above, the same process in Embodiment 1 is performed so as to operate the application 50 with speech input so that the user can enjoy the application such as a game in a multilingual environment.

In the above description, an example of the configuration of the speech input user interface in English and German has been described, but it is needless to say that the present invention can be applied to other languages. The language include dialects, and thus the present invention can be applied to dialects such as Western dialect and Texas dialect as well as languages such as English and German.

Embodiment 4

A semantic recognition system according to Embodiment 4 will be described with reference to figures. The semantic recognition system of Embodiment 4 is an example of the same semantic recognition system as those of Embodiments 1 to 3, but the semantic recognition system of Embodiment 4 is provided on a client and a server structure.

Figure 14:
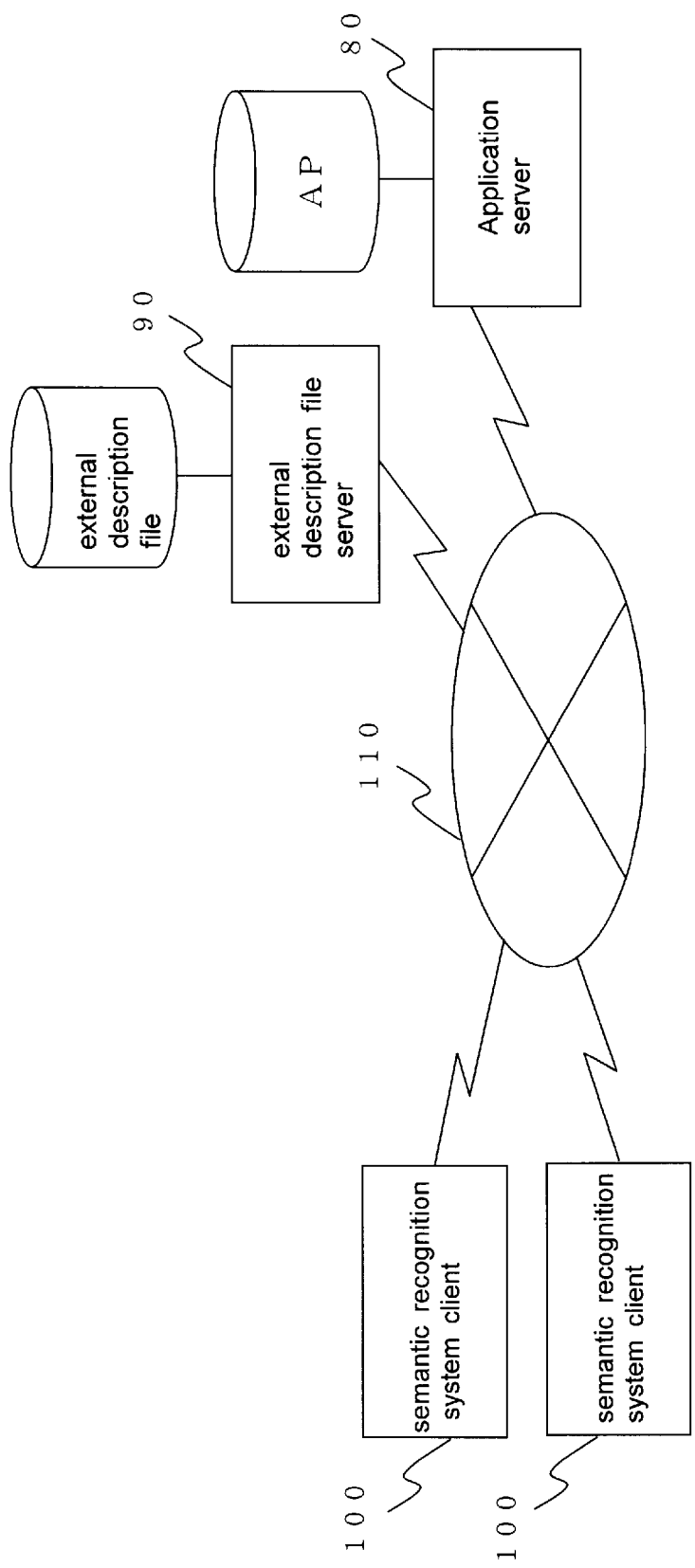
FIG. 14 is a schematic diagram showing a semantic recognition system according to Embodiment 4 of the present invention.
Figure 15:
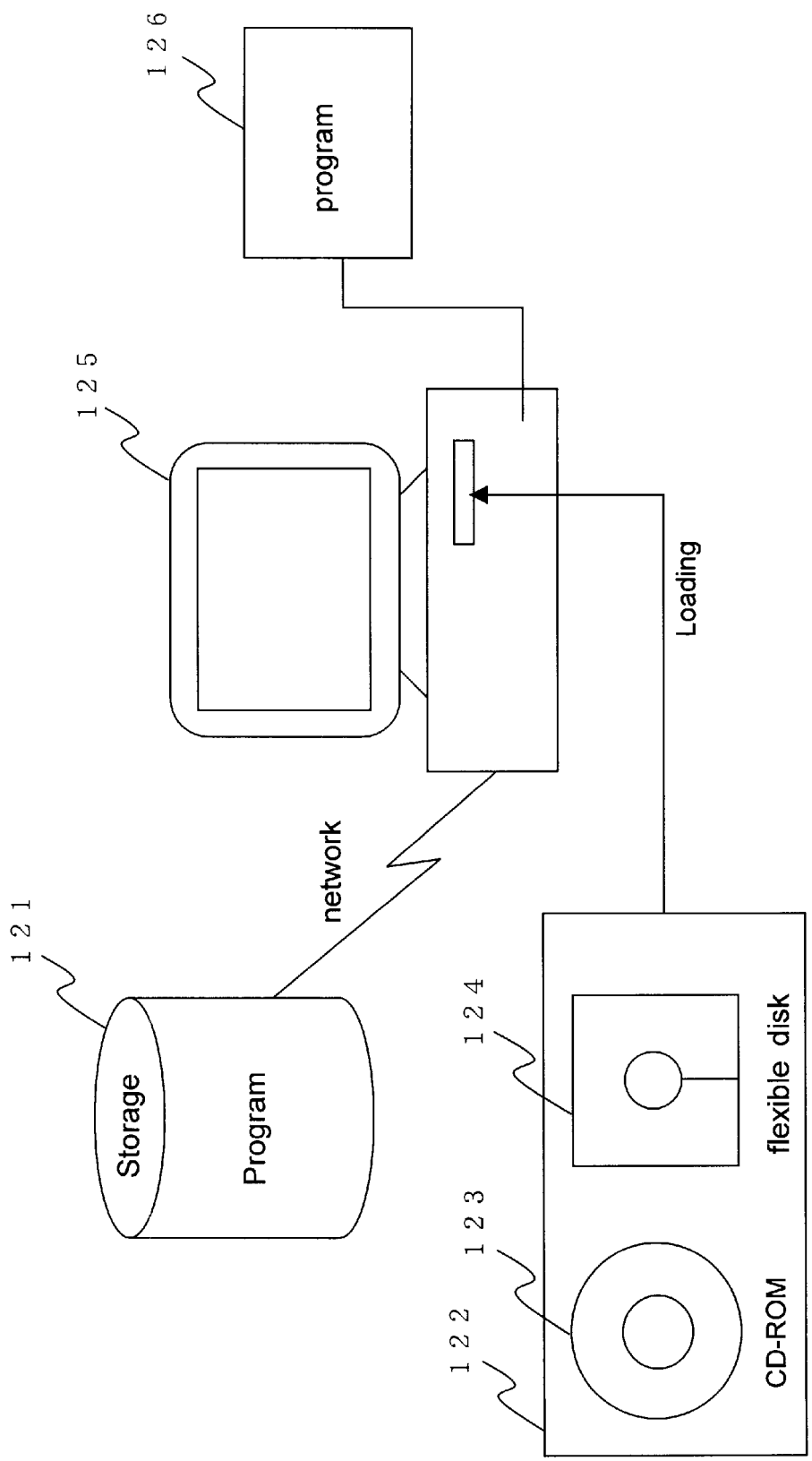
FIG. 15 is a diagram showing an example of a recording medium.

FIG. 14 shows the outline of the entire structure of the system.

As shown in FIG. 14, an application server 80 and an external description file server 90 are arranged on the network. A variety of applications 50 are registered in the application server 80, and the application 50 is provided in response to a request of a client 100. The external description files 60, each of which corresponds to a language or a dialect, are registered in the external description file server 90. The external description file 60 of the semantic recognition system shown in FIGS. 6 and 11 can be accessed remotely on the network. In order words, the registered recognition word corresponding to the semantic number is notified in response to a request for reference based on the semantic number from the semantic recognition system client 100.

The semantic recognition system client 100 may include a speech input device 10, a speech signal file 20, a speech recognizer 30, a speech recognition engine 31, a speech recognition word updater 32, a recognized word-semantic number converter 40, a semantic number-registered word list 41, a semantic number-registered word list changer 42, a semantic number acquirer 43, a semantic number-registered word list generator 44, a registered word notifier 45 and a use language selector 70, although they are not shown.

Furthermore, although not shown, both of the server and the client include communication interfaces for connection to the network. The network 110 can be any kind of network such as a local area network, the internet, as long as it can communicate data, and it can be a private line, a public line, wire communication, or wireless communication.

The above-described embodiment can provide the external description file on the client and server structure including the external description file server on the network. This eliminates the necessity of preparing the external description file for each language for an individual semantic recognition system.

Embodiment 5

The semantic recognition system of the present invention is described as a program including process steps to realize the semantic recognition system, and the program is recorded in a computer-readable recording medium, so that the semantic recognition system of the present invention can configured on various computers. The recording medium where the program including process steps to realize the semantic recognition system of the present invention can be a transportable recording medium 122 such as a CD-ROM 123 and a flexible disk 124, a recording medium 121 in a storage on the network, or a recording medium 126 on a computer such as a hard disk or a RAM. The program is loaded on the computer 125 and executed on the main memory.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A semantic recognition system providing a user interface capable of receiving speech input to a user and an application interface that conveys an input content of the user to an application, the semantic recognition system comprising:
   a speech signal input part for receiving input speech signals;
   a speech recognizer for recognizing a corresponding word based on the input speech signals;
   a recognized word-semantic number converter including a semantic number-registered word list indicating a correspondence between a semantic number representing a meaning of a word and a registered word belonging to the semantic number;
   an application interface; and
   an application handling the semantic numbers as data,
   wherein the corresponding word is recognized by the speech recognizer, based on the speech signals input to the speech signal input part,
   the recognized word is converted to a corresponding semantic number by the recognized word-semantic number converter, and
   the converted semantic number is notified to the application via the application interface.

2. The semantic recognition system according to claim 1, further comprising a semantic number-registered word list updater for updating a content of the semantic number-registered word list in the recognized word-semantic number converter.

3. The semantic recognition system according to claim 1, further comprising an external description file storing a word-semantic system table that systematically describes a semantic number obtained by classifying meanings systematically and coding each semantic unit and a registered word belonging to each semantic number.

4. The semantic recognition system according to claim 3, wherein
   the application contains the semantic number at least in a part of process data, and
   the recognized word-semantic number converter comprises a semantic number acquirer for acquiring the semantic number described in the application via the application interface, and a semantic number-registered word list generator for extracting a registered word corresponding to the acquired semantic number from the word-semantic system table in the external description file so as to generate the semantic number-registered word list.

5. The semantic recognition system according to claim 4, wherein
   the recognized word-semantic number converter comprises a registered word notifier for notifying the speech recognizer of registered words listed in the generated semantic number-registered word list, and
   the speech recognizer comprises a speech recognition word updater for updating a content of a speech recognition engine based on the notified registered word.

6. The semantic recognition system according to claim 5, comprising:
   a use language selector for selecting a language for the user to use;
   external description files each of which corresponds to each of a plurality of languages as the external description file; and
   speech recognition engines each of which corresponds to each of a plurality of languages as the speech recognition engine in the speech recognizer,
   wherein the semantic number-registered word list generator generates a semantic number-registered word list, based on the external description file of a language selected by the use language selector, and
   the speech recognizer uses the speech recognition engine of a language selected by the use language selector,
   whereby a multilingual user interface preparing the application for input instructions in a plurality of languages can be provided to the user.

7. The semantic recognition system according to claim 6 built into a client-sever system, comprising
   an external description file server for providing the external description file;
   an application server for providing the application;
   at least one semantic recognition system client including the speech signal input part, the speech recognizer, the recognized word-semantic number converter and the application interface, wherein the external description file server, the application server and the semantic recognition system client are connected via a computer network.

8. The semantic recognition system according to claim 5 built into a client-sever system, comprising an external description file server for providing the external description file;

an application server for providing the application;

at least one semantic recognition system client including the speech signal input part, the speech recognizer, the recognized word-semantic number converter and the application interface, wherein the external description file server, the application server and the semantic recognition system client are connected via a computer network.

9. The semantic recognition system according to claim 3, wherein the application contains the semantic number at least in a part of process data, and comprises the process steps of:
extracting a corresponding registered word from the word-semantic system table in the external description file, based on the semantic number described in the application, and
notifying the recognized word-semantic number converter of
the semantic number and the registered word, and
the recognized word-semantic number converter comprises a semantic number-registered word list generator for generating the semantic number-registered word list, based on the semantic number and the registered word acquired from the application.

10. The semantic recognition system according to claim 9, wherein the recognized word-semantic number converter comprises a registered word notifier for notifying the speech recognizer of registered words listed in the generated semantic number-registered word list, and the speech recognizer comprises a speech recognition word updater for updating a content of a speech recognition engine based on the notified registered word.

11. The semantic recognition system according to claim 10, comprising:

a use language selector for selecting a language for the user to use;

external description files each of which corresponds to each of a plurality of languages as the external description file; and speech recognition engines each of which corresponds to each of a plurality of languages as the speech recognition engine in the speech recognizer, wherein the semantic number-registered word list generator generates a semantic number-registered word list, based on the external description file of a language selected by the use language selector, and the speech recognizer uses the speech recognition engine of a language selected by the use language selector, whereby a multilingual user interface preparing the application for input instructions in a plurality of languages can be provided to the user.

12. The semantic recognition system according to claim 11 built into a client-sever system, comprising an external description file server for providing the external description file;

an application server for providing the application;

at least one semantic recognition system client including the speech signal input part, the speech recognizer, the recognized word-semantic number converter and the application interface, wherein the external description file server, the application server and the semantic recognition system client are connected via a computer network.

13. The semantic recognition system according to claim 10 built into a client-sever system, comprising an external description file server for providing the external description file;

an application server for providing the application;

at least one semantic recognition system client including the speech signal input part, the speech recognizer, the recognized word-semantic number converter and the application interface, wherein the external description file server, the application server and the semantic recognition system client are connected via a computer network.

14. A computer-readable recording medium where a semantic recognition process program is recorded, the program describing process steps for realizing a system for providing a user interface capable of receiving speech input to a user and an application interface that conveys an input content of the user to an application, the program comprising the process steps of:

a speech signal input process step of receiving input speech signals;

a speech recognizing process step of recognizing a corresponding word based on the input speech signals;

a semantic number-registered word list generating process step of generating a semantic number-registered word list indicating the correspondence between a semantic number representing a meaning and a registered word belonging to the semantic number;

a recognized word-semantic number converting process step of converting a word recognized at the speech recognizing process step to a corresponding semantic number with reference to the generated semantic number-registered word list; and a semantic number notifying process step of notifying the application of the converted semantic number.

* * * * *

UNITED STATES PATENT AND TRADEMARK OFFICE
CERTIFICATE OF CORRECTION

PATENT NO. : 5,991,719
DATED : November 23, 1999
INVENTOR(S) : Masatomo YAZAKI et al.

It is certified that error appears in the above-identified patent and that said Letters Patent is hereby corrected as shown below:

On the Title Page, [73] Assignee, change "FUJISTU" to --FUJITSU--.

Signed and Sealed this

Twelfth Day of September, 2000

Attest:

Q. TODD DICKINSON

*Attesting Officer*       *Director of Patents and Trademarks*